United States Patent [19]

Sholle

[11] 4,117,297
[45] Sep. 26, 1978

[54] FERRULE FOR STUD WELDING
[75] Inventor: Roger W. Sholle, Lorain, Ohio
[73] Assignee: TRW Inc., Cleveland, Ohio
[21] Appl. No.: 743,865
[22] Filed: Nov. 22, 1976

Related U.S. Application Data

[63] Continuation-in-part of Ser. No. 590,623, Jun. 26, 1975, abandoned.

[51] Int. Cl.$^2$ ............................................. B23K 9/32
[52] U.S. Cl. ...................................... 219/98; 219/136
[58] Field of Search ................... 219/98, 99, 127, 136

[56] References Cited

U.S. PATENT DOCUMENTS

| | | | |
|---|---|---|---|
| 2,788,435 | 4/1957 | Maras | 219/136 |
| 3,182,173 | 5/1965 | Dash | 219/99 |
| 3,210,517 | 10/1965 | Van Den Blink et al. | 219/99 |
| 3,291,438 | 12/1966 | Logan | 219/99 X |
| 3,408,472 | 10/1968 | Spisak | 219/98 |

*Primary Examiner*—E. A. Goldberg
*Attorney, Agent, or Firm*—Allen D. Gutchess, Jr.

[57] ABSTRACT

A ferrule for use in end welding a stud to a workpiece and a method of welding with the ferrule are set forth. In end welding a stud to a workpiece, the stud is first placed with an end against the workpiece and is then retracted as a low current pilot arc is formed between the stud and the workpiece. A main high current weld arc is then superimposed between the stud and the workpiece. This arc causes portions of the stud and the workpiece to be molten and the stud is then plunged forward to engage the workpiece. The molten portions join and solidify to securely weld the stud to the workpiece when they return to full contact. Some of the molten metal tends to flow outwardly as the stud strikes the workpiece to establish a fillet between the stud and the workpiece. This fillet under normal conditions is substantially uniformly formed with the aid of a ferrule located around the end of the stud to help control the flow of molten metal and to reduce splatter of the metal. Under some welding applications, the flow of molten metal is not uniform around the stud but may be excessive on one side and on the opposite side, there may be a cavity or washout where the fillet would otherwise be, between the welded stud and the workpiece. The invention provides a ferrule which has vents on one side and is solid on the opposite side. The ferrule is placed so that the solid side is located where the molten metal tends to flow the heaviest. This tends to block the excess flow to prevent molten metal loss and to achieve a more uniform fillet around the stud.

12 Claims, 6 Drawing Figures

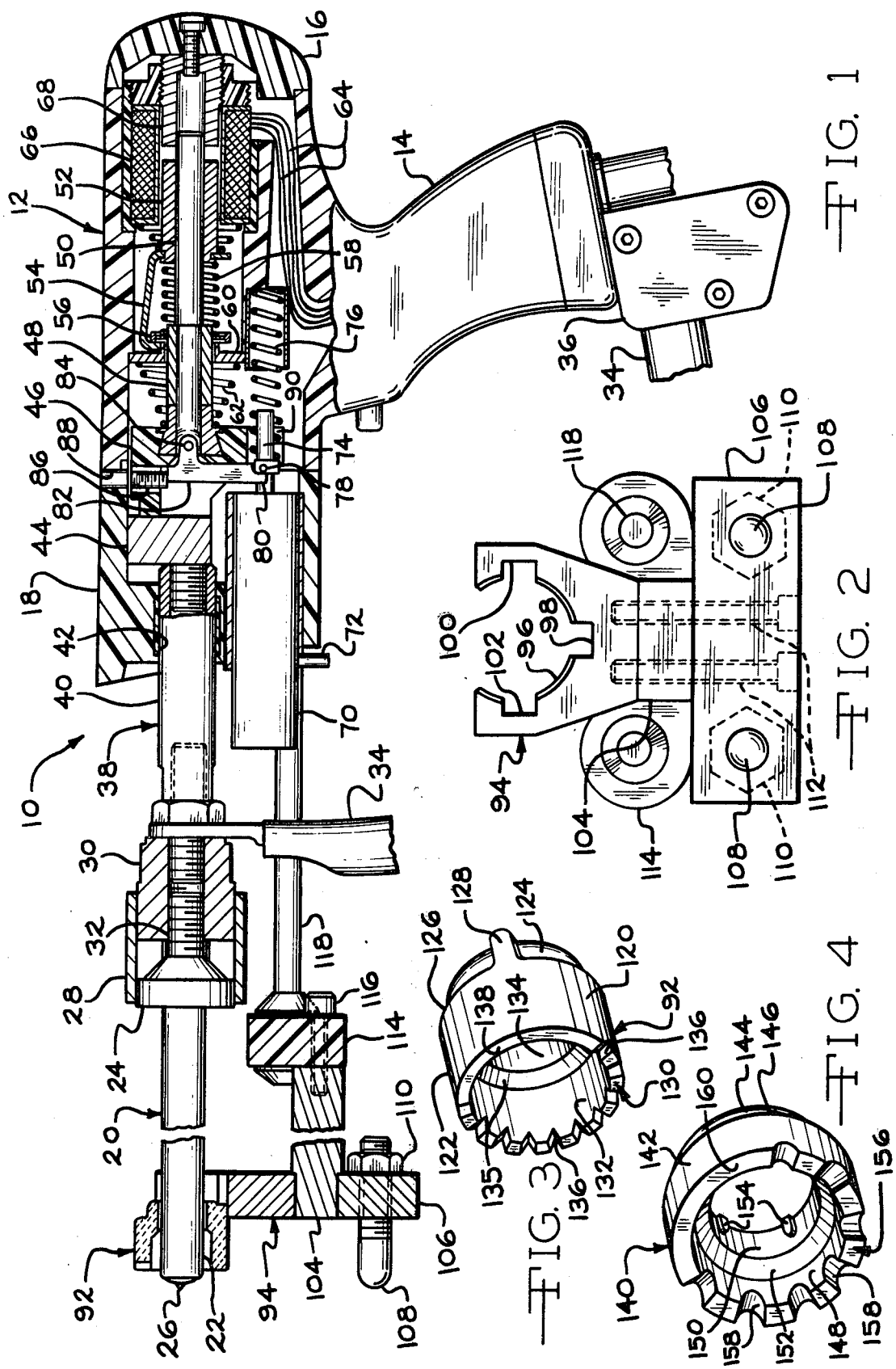

FERRULE FOR STUD WELDING

This application is in a continuation-in-part of my co-pending application Ser. No. 590,623, filed on June 26, 1975 now abandoned.

This invention relates to a ferrule for use in stud welding and to a method for welding with the ferrule.

In the end welding of a stud to a workpiece, the stud is usually provided with a body of flux at one end. This end is pressed against the workpiece and is then retracted as a relatively low current arc is formed between the stud and the workpiece. After the stud is retracted, a main weld current is superimposed over the pilot arc. This heavier welding arc causes portions of the stud end and the adjacent area of the workpiece to become molten. The stud is then plunged forward and engages or contacts the workpiece again, and the molten metal portions are joined and solidify to provide a secure weld between the stud and the workpiece.

With most studs, particularly larger ones having diameters in excess of approximately one-quarter inch and up to seven-eighths inch, a ceramic ferrule is placed around the stud during the welding operation. This ferrule heretofore has had a plurality of vents located at the edge adjacent the workpiece to provide controlled venting of the gases established during welding and also to control the flow of molten metal, some of which tends to splatter as the stud strikes or engages the workpiece. Under most welding conditions, the flow of the molten metal is substantially uniform around the stud with the result that the molten metal usually extends slightly beyond the stud circumference and forms a fillet between the stud and the workpiece. The fillet adds strength to the weld and provides a uniform appearance when it is uniformly established.

When welding under certain conditions, the flow of the molten metal does not tend to be uniform but tends to flow more toward one side of the stud. This occurs, for example, when a larger diameter stud, and particularly those in excess of one-half inch in diameter, are welded to vertical surfaces. In such an instance, the molten metal resulting from the welding arc tends to flow downwardly under the influence of gravity to provide a heavy fillet on the bottom side and to form a cavity or washout on the upper side of the stud, between the stud and the workpiece. This results in a weaker weld than otherwise and an unsightly appearance for the welded stud.

Another application when the molten metal tends to flow more fully in one direction from the stud exists when the stud is welded near an edge of a metal workpiece, such as near the edge of a flange of a beam. During welding, a magnetic field is established around the stud due to the current flow resulting from the welding arc. With the stud welded near the edge of a metal workpiece, the lines of force of the magnetic field are concentrated more fully between the stud and the edge. This concentration of force causes the molten metal of the stud and the workpiece resulting from the weld to flow away from the edge, producing a heavy fillet on the side opposite the edge and, at least in some instances, a cavity or washout between the stud and the workpiece toward the edge. Under this condition, the ferrule according to the invention having vents in one side and a solid wall on the opposite side can be placed so that the solid side is on the side of the stud opposite the edge. The gases and molten metal than tend to flow through the vents toward the edge of the workpiece and overcome the effect of the asymmetrical magnetic field and thereby establish or at least substantially establish the uniform flow of molten metal around the stud.

A third application where non-uniform flow of the molten metal results exists when a stud is welded to an elongate metal workpiece at one area with a ground connected to the workpiece at a distance to one side of the welding area. Under these conditions, the molten metal tends to flow more heavily in a direction away from the ground, apparently because the strength of the magnetic field is more concentrated on the side of the stud toward the ground. In this instance, the ferrule in accordance with the invention can be placed with the solid or non-vented side on the side of the stud opposite the ground. This again overcomes the tendency for the strong flow in that direction and a more uniform weld thereby is produced.

It is, therefore, a principal object of the invention to provide a welding ferrule having vents disposed in a nonuniform manner around the periphery of the ferrule.

Another object of the invention is to provide a welding ferrule having vents on one side and being solid on the opposite side.

A further object of the invention is to provide a method of welding studs with a ferrule of the type described to achieve a more uniform weld.

Yet another object of the invention is to provide a method of welding a stud to a workpiece by blocking venting on one side thereof toward which molten metal formed during the weld tends to flow.

Many other objects and advantages of the invention will be apparent from the following detailed description of preferred embodiments thereof, reference being made to the accompanying drawings, in which:

FIG. 1 is a somewhat schematic view in longitudinal, vertical cross section of a welding tool embodying the invention;

FIG. 2 is a front view in elevation of certain components of the tool of FIG. 1;

FIG. 3 is a view in perspective of a welding ferrule in accordance with the invention;

FIG. 4 is a view in perspective of a slightly modified welding ferrule in accordance with the invention;

Figure 5:
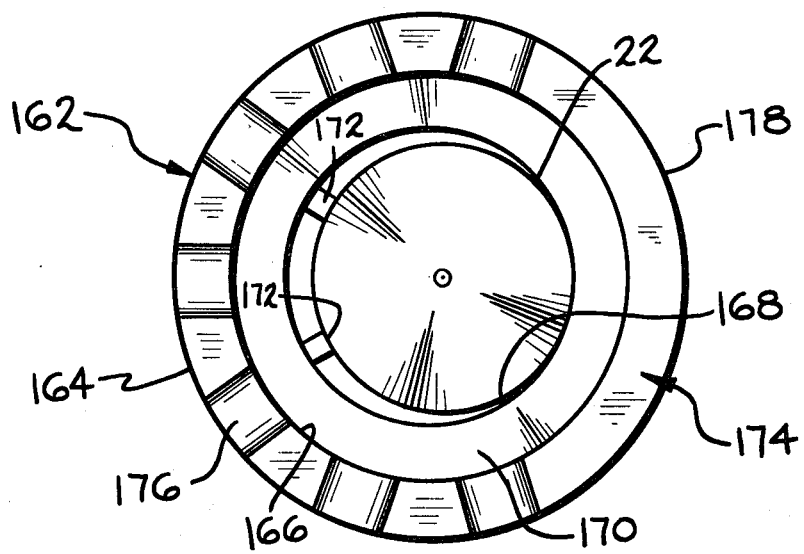
FIG. 5 is an end view of a stud and a modified welding ferrule in accordance with the invention.

Referring particularly to FIG. 1, a welding tool 10 preferably is used to weld a stud by a drawn arc technique. As such, the tool includes means for retracting a stud from a surface of a workpiece, means for holding the stud in the retracted position, and means for moving the stud toward and against the workpiece. A separate power source and controls impose a voltage between the stud and the workpiece as the stud is withdrawn to form a pilot arc. The controls also determine when the stud is plunged back toward the workpiece, and when a higher current is imposed to establish a main welding arc between the stud and the workpiece. The main welding arc melts a portion of the end of the stud and a portion of the adjacent workpiece, with the molten metal portions then joining and solidifying as the stud engages the workpiece to provide a secure weld between them.

The stud welding tool 10 includes a main body or housing 12 of suitable dielectric material, the body having a grip or handle 14, a separable rear end cap 16, and a forward end section 18. In this instance, a stud 20 to be welded to the workpiece includes a main shank 22 and a head 24 with a body of welding flux 26 located at the forward, weldable end of the stud. Studs of this nature are often welded to beams over which concrete is poured or can be used on vertical surfaces over which a refractory material is applied, by way of example.

The stud 20 is held by a stud holder or chuck 28 having slots forming fingers which resiliently engage the head 24 of the stud. The chuck 28 extends forwardly of a connecting body 30 which also holds an internal member 32 which backs up the stud during welding. Immediately behind the body 30, a main welding cable 34 is suitably attached, the cable 34 extending rearwardly to a bracket 36 mounted below the grip 14. The chuck 28 and the connecting body 30 are attached to a chuck leg assembly 38 which includes a shank 40 extending through a bearing 42 in the front housing section 18 to a clamp 44 which is attached by side screws (not shown) to a lifting rod head 46. The head 46, in turn, is connected to a lifting rod 48 having a guide rod 50 extending rearwardly through a movable core 52. A lifting hook 54 is attached to the movable core 52 and is positioned to engage a lifting ring 56 when moved rearwardly by the movable core 52.

The lifting ring 56 has an inner diameter exceeding the outer diameter of the lifting rod 48 so that the lifting rod 48 can move longitudinally relative to the ring 56 when the ring is held perpendicular to the rod. The ring is normally held in this position by a lifting ring spring 58 which urges the ring 56 against a rear extension of a stop plate 60. The stop plate, in turn, is held in position against shoulders in the housing 12 by a main plunge spring 62. With this arrangement, the lifting rod 48 can move back somewhat when the stud is pressed against the workpiece prior to being welded, to assure that the stud will contact and fully engage the workpiece during the plunge stroke, even after a portion of the end of the stud is melted or burned off. However, when the ring 56 is moved by the lifting hook 54 to a canted position, further retraction of the core 52 also retracts the lifting rod 48 a predetermined distance. Consequently, all of the studs will be retracted a uniform, predetermined distance from the workpiece during the lifting or retraction stroke, even though their lengths may differ somewhat so that some are pushed back more than the others when initially pressed against the workpiece.

The movable core 52 is retracted when current is supplied through suitable leads 64 to a lifting and holding coil 66. The rearward movement of the core 52, which determines the extent of retraction of the stud and the chuck, is limited by an adjustable core piece 68.

If the plunge spring 62 is allowed to move the chuck leg assembly 38 forwardly without restriction, the end of the stud 20 can strike the workpiece with considerable speed and force. Particularly with larger studs, the molten metal produced by the main welding arc can be forced or splashed outwardly a considerable distance, even to the point of leaving insufficient molten metal between the stud and the workpiece to provide the strongest weld. To reduce or overcome this problem, the welding tool 10 is provided with a plunge dampening mechanism by means of which the travel of the stud is slowed down substantially prior to contacting the workpiece.

The dampening mechanism, in this instance, includes a commercially-available hydraulic cylinder 70 which is located in the front housing section 18. The cylinder 70 has an adjusting pin 72 which can be moved transversely to the longitudinal extent of the cylinder to change the degree of dampening effected thereby. The cylinder 70 has a rearwardly-extending piston rod 74 which is urged forwardly by a spring 76 engaging a shoulder of the rod 74. The rod 74 also has a roll pin 78 extending outwardly on each side thereof. The roll pin is engagable by bifurcated legs 80 of a damper arm 82. The arm 82 is pivotally connected to the lifting rod head 46 by pins 84 and has an upper end engagable by a setscrew 86 which is carried by the head 46 and is accessible through an opening 88 in the tool housing 12. When the lifting rod 48 is retracted, the bifurcated legs 80 of the damper arm 82 engage the roll pin 78 and pull the piston rod 74 rearwardly. The extent to which the piston rod is moved is determined by the setscrew 86. The farther the setscrew is moved in, the farther the arm 82 will move the roll pin 78 and the piston rod 74 to the rear, and vice versa.

The lifting rod head 46 also has a lower slot forming bifurcated legs 90 which straddle the piston rod 74 and also the rod spring 76. When the legs 90 move forwardly during the plunge stroke with the lifting rod head 46, the legs engage the roll pin 78 and move the piston rod 74 forwardly. However, the rate of travel of the piston rod 74 is determined by the piston in the hydraulic cylinder 70 with the result that the movement of the chuck leg assembly 38, including the head 46, is controlled by the rate of movement of the piston rod 74. When the setscrew 86 is adjusted so that the arm 82 has a degree of free movement, the roll pin 78 will not be retracted to the extent that the lifting rod head 46 is. Consequently, during the plunge stroke, the lifting rod head 46 will move freely until its legs 90 engage the roll pin 74. Thus, the plunge stroke can consist of a first portion which is unrestricted and a second portion, after the head legs 90 engage the roll pin 78, which is restricted and controlled by the movement of the piston in the hydraulic cylinder 70. The stud strikes or engages the workpiece at a much slower speed than it would otherwise, with the result that much less molten metal is forced or splashed away by the engagement of the stud and the workpiece.

A ferrule 92 in accordance with the invention is positioned around the weldable end of the stud 20 and will be discussed in detail subsequently. The ferrule 92 is held by a heavy metal ferrule holder 94 having an arcuate opening 96 in which a portion of the ferrule is received, with the opening also having three mutually perpendicular notches 98, 100, and 102. The ferrule holder 94 is mounted on a metal shank 104, on the opposite side of which is a metal bipod mounting plate 106. Two bipod legs 108 have threaded shanks engaged in tapped openings of the bipod plate so that the extent of their extremities beyond the plate can be readily adjusted. The positions of the legs 108 relative to the plate 106 are then maintained by jam nuts 110. The bipod legs 108 along with the ferrule 92 provide a triangular support for the welding tool 10 on the workpiece to assure perpendicularity of the tool and the stud 20 relative to the workpiece. The bipod plate 106 and the holder 94 are affixed to the shank 104 by two long cap screws 112. The metal components preferably are of brass which better withstands contact with molten metal from the welds.

The metal shank 104 is electrically isolated from the welding tool 10 by a dielectric mounting bracket 114. The shank 104 is affixed to a central portion of the bracket 114 by suitable cap screws 116 while spaced, outer portions of the bracket 114 are suitably affixed to two adjustable mounting legs 118. The mounting legs 118 extend through side portions of the front housing section 18 and the main housing 12, being adjustably affixed therein by suitable setscrews (not shown), as is well known in the art. The position of the legs 118 relative to the welding tool housing determines the position of the ferrule 92 relative to the stud 20. The weldable end of the stud 20 must project beyond the ferrule 92 a distance sufficient to assure that the stud will fully engage the workpiece upon completion of the plunge stroke of the chuck leg assembly 38. For example, if the molten metal produced by the main welding arc results in a burnoff of three-sixteenths inch for the end of the stud 20 and the adjacent area of the workpiece, then the stud must initially project at least three-sixteenths inch beyond the ferrule 92 before the stud is pressed against the workpiece to seat the ferrule thereagainst.

Referring now in more detail to the ferrule 92 of FIG. 3, the ferrule includes a ceramic body 120 which is molded and then fired to produce a strong, self-sustaining material. The ferrule has a large diameter outer surface 122 and a smaller outer diameter portion or neck 124 with a shoulder 126, therebetween. The neck 124 also has orienting means in the form of a projection or key 128 formed thereon, in this instance. The neck 124 has a diameter slightly less than that of the arcuate opening 96 of the holder 94 so that this portion of the ferrule can be received in the holder with the shoulder 126 abutting the forward face of the holder. The key 128 is usually received in the central notch 98 of the ferrule holder to orient the ferrule therein relative to the tool, but the key can also be placed in either of the notches 100 and 102 as will be discussed more fully subsequently.

The ferrule also has a generally annular forward end or face 130 with a large diameter internal cavity 132 adjacent the face and a smaller diameter passage 134 spaced from the annular face 130 beyond a shoulder 135 and of a diameter slightly exceeding the diameter of the stud shank 22.

In accordance with the invention, the annular face 130 of the ferrule 92 has a plurality of substantially uniformly-spaced, V-shaped notches or vents 136 therein which, however, only extend partly around the face 130. The face, in this instance, also has a solid portion or wall 138 which extends from about one-fourth to less than one-half the periphery of the annular face 130. In a preferred form, the solid wall 138 extends through an included angle of from approximately 100° to 140°, the center of the angle being at the axis of the ferrule.

The inner cylindrical cavity 132 of the ferrule is substantially larger in diameter than the shank 22 of the stud to provide a semi-confined zone for the molten metal and gases formed during the welding operation. The vents 136 provide controlled escape for the gases while substantially blocking most of the molten metal which otherwise tends to splatter to some degree, even with the plunge dampening effect on the chuck and chuck leg assembly. The molten metal of the stud and workpiece also is inhibited somewhat from flowing outwardly so as to be retained as a fillet between the stud and the workpiece to increase the strength of the weld. The solid wall 138 of the annular face 130 of the ferrule also inhibits flow of the molten metal in that direction to an even greater extent than the vented portion of the annular face. Consequently, when the stud is to be welded under conditions in which the molten metal tends to flow more markedly in one direction, the solid portion 138 of the ferrule is positioned to intercept flow in that direction and thus overcome the asymmetrical flow of the metal from the stud.

The cavity 132 is of a larger diameter than the cavities of the usual ferrules because of the somewhat lesser venting area. The diameter of the outer surface 122 preferably remains the same so that the ferrule wall is thinner. The thinner wall results in the vents 136 being shorter which increases their venting effectiveness, while at the same time the vents are increased in size so that overall venting is not much less than that achieved with the usual ferrule.

When the studs, particularly in larger diameters exceeding one-half inch, are to be welded to a vertical surface, the force of gravity tends to cause the molten metal to flow downwardly, thereby creating a heavier fillet on the lower portion of the stud and either no fillet or even a washout or cavity on the upper surface of the stud. A weaker weld is thereby produced and the weld also is less attractive than otherwise, which is a factor of consideration when the stud is to be left exposed. In such an instance, the ferrule is placed in the ferrule holder with the key 128 in the notch 98. Since the key is symmetrically located with respect to the solid wall 138 of the ferrule face 130, this assures that the solid wall 138 will be positioned below the stud so as to inhibit the flow of molten metal therefrom in a downward direction. Consequently, a substantially uniform or at least a substantially more uniform fillet is achieved around the welded stud than achieved with ferrules heretofore known in which the vents are symmetrically located with respect to the axis of the ferrule.

If the studs are being welded to a vertical surface where an obstruction exists so that the grip 14 of the tool 10 is in the way, then the handle can be moved 90° to one side or the other and the key 128 of the ferrule correspondingly placed in the notch 100 or the notch 102, whichever is pointing downwardly.

Another application in which the flow of molten metal from the stud is asymmetrical, being stronger in one direction, exists when the stud 20 is being welded to a beam near the edge thereof. A magnetic field is established around the weldable end of the stud during the welding operation by the current flow in the welding arc. With the stud near the edge of the beam, the forces of the magnetic field are more concentrated between the stud and the edge of the beam where the space is limited. The concentration of the magnetic forces in this area force the molten metal of the weld in a direction away from the beam edge and necessary molten weld metal would be lost through normal ferrule vents. A heavy fillet on one side and the lack of a fillet or even a cavity on the opposite side again results in an undesirable weld. However, the solid wall 138 of the annular face 130 of the ferrule 92 placed on the side of the stud opposite the beam edge, the stronger flow again is inhibited and a more uniform fillet can be produced for the welded stud.

A third application in which an asymmetrical molten metal flow results exists when the stud is welded to one position on a workpiece, especially an elongate workpiece, and the workpiece is grounded at a portion from the weld area. In this instance, the magnetic field formed during the welding operation produces concentrated lines of force on the side of the stud toward the ground. A stronger flow of the molten metal in a direction away from the ground thereby results with conventional ferrules. However, with the ferrule 92 according to the invention, the solid wall 138 is placed on the side of the stud opposite the ground to overcome the tendency for stronger molten flow in that direction. Again, a stronger, more uniform, and more desirable weld is achieved by the use of the ferrule according to the invention.

Referring to FIG. 4, a slightly modified ferrule 140 is shown. The ferrule 140 has large and smaller outer diameter portions 142 and 144, with a shoulder 146 therebetween. The smaller diameter portion 144 can be received in a ferrule holder as is true for the portion 124 of the ferrule 92. The ferrule 140 also has a larger diameter lower cylindrical cavity 148 and a smaller diameter passage 150 with a shoulder 152 therebetween. In this instance, the passage 150 is somewhat larger in diameter than the shank of the stud to be welded with the passage 150 spaced from the stud by four ribs or projections 154. A lower annular face or end 156 of the ferrule has a plurality of uniformly-spaced vents 158 around a portion of the periphery thereof. In this instance, the vents 158 are larger than the V-shaped vents 136 of the ferrule 92 and are of generally inverted, squared U-shaped configuration to provide a larger open area. The annular face 154 of the ferrule also has a solid wall portion 160 which can extend around the annular face 154 about the same distance as the solid wall 138 of the ferrule 92.

The ferrule 140 enables substantially larger amounts of gases and welding products to be vented which is achieved through the annular area between the stud and the passage 150 and also through the large vents. This is particularly important in through-deck welding where a stud is welded through a metal deck to a beam therebelow. Since portions of the metal deck are melted and vaporized, considerably more welding products must be dissipated. However, the asymmetrical location of the vents 158 achieves results similar to those achieved with the ferrule 92 and the ferrule 140 is used in the same manner.

It has been found that positioning the ferrule asymmetrically with respect to the stud can enhance the flow of molten metal toward the vented side of the ferrule. Referring to FIG. 5, a ferrule of this type is indicated at 162. It includes a large outer diameter portion 164 and a smaller outer diameter portion (not shown) with the smaller portion being similar to the portions 144 and 124 of the ferrules 140 and 92, respectively, and receivable in a ferrule holder. The ferrule 162 also has a large diameter cylindrical cavity 166 and a concentric, smaller diameter passage 168 with a shoulder 170 therebetween. The diameter of the passage 168 is somewhat larger, e.g. 0.050 inch than the diameter of the stud shank 22, with the passage 168 being spaced from one side of the shank 22 by two ribs or projections 172. The projections 172 space the passage 168 farthest from the stud shank 22 on the side opposite the unvented side of the ferrule. The ferrule 162 has a lower annular face 174 with a plurality of uniformly-spaced vents 176 around a portion of the periphery thereof, with the vents being generally similar to the vents 158 of the ferrule 140, in this instance. The annular face 174 of the ferrule also has a solid wall portion 178 which can extend around the face about the same distance as the solid wall 138 of the ferrule 92 or the solid wall 160 of the ferrule 140. The solid wall 178 is located on the side of the stud shank 42 opposite the projections 172.

The asymmetrical positioning of the ferrule 162 relative to the stud shank 22 enhances the flow of metal away from the solid wall 178. Additional venting is achieved with the asymmetrical positioning because gases can escape more readily between the small diameter passage 168 of the ferrule 162 and the spaced surface of the stud shank 22. Thus, there is a tendency for increased flow of gases and molten metal away from the solid wall 178. Second, the asymmetrical positioning of the ferrule relative to the stud also positions the chamber cavity 166 so that a larger volume thereof exists on the side of the stud opposite the solid wall 178. This larger volume on the vented side of the ferrule further achieves flow in that direction since the larger volume reduces restriction of flow in that direction. Hence, the ferrule 162 achieves a greater flow of gas and metal in the direction toward the vents 176.

Figure 6:
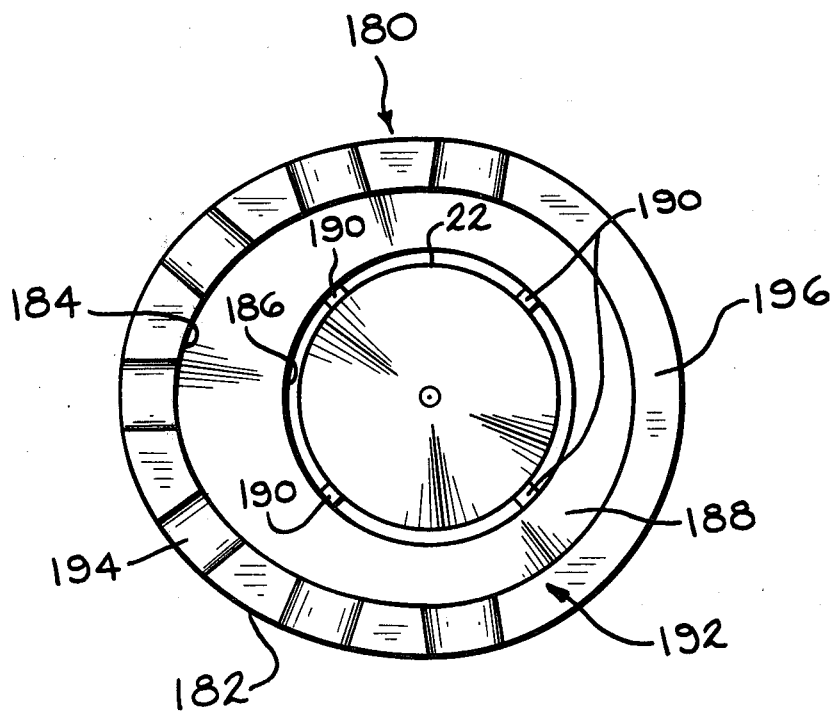
FIG. 6 is an end view of a stud and a further modified welding ferrule in accordance with the invention.

A slightly modified ferrule 180 is shown in FIG. 6. The ferrule 180 has a cavity which is asymmetrical with respect to the shank of the stud but, unlike the ferrule 174, has a small diameter portion or neck which is symmetrical with the shank of the stud. The ferrule 180 includes a large outer portion 182 and a smaller outer portion (not shown) which is received in the ferrule holder, as before. The ferrule 180, in this instance, has a large lower cavity 184 which is positioned asymmetrically with respect to the stud shank 22 and forms a larger volume on the side of the shank opposite the unvented side of the cavity. The ferrule also has a smaller passage 186 with a shoulder 188 formed between the cavity and the passage. As shown, the passage 186 is somewhat larger in diameter than the shank of the stud and is spaced uniformly therefrom by four ribs or projections 190. However, the passage 186 could be smaller, similar to that of the ferrule 92.

The ferrule 180 also has a face or end 192 with suitable vents 194, shown as being similar to the vents 176, and a solid wall portion 196 which can extend around the face 192 about the same distance as the solid wall portion of the other ferrules. The cavity 184, in this instance, is specifically designed to be asymmetrical with respect to the smaller passage 186 to provide a larger volume on the side of the stud opposite the solid wall portion 196. The larger volume provides less restriction to the flow of the gases and molten metal in that direction and again achieves a stronger flow away from the solid wall portion 196. While the cavity 184 is shown as being oval or of a similar shape, it will be readily understood that it can also be cylindrical but asymmetrically-formed with respect to the passage 186, to provide the large volume on the side of the shank away from the solid wall portion.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A ferrule for use in welding a stud to a workpiece by a drawn-arc welding technique said ferrule comprising a ceramic body having a front face, an outer front wall near the front face, an inner front wall near the front face and spaced substantially uniformly from said outer wall, and an inner rear wall forming a passage therethrough of smaller transverse cross section than that of said inner front wall, a plurality of substantial uniformly-spaced notches in said front face, extending from the outer front wall through to the inner front wall, and extending around from one-half to three-fourths of said front face, the remainder of said front face being arcuate and substantially unvented from the last of said notches at one end of the plurality to the last of said notches at the other end of the plurality, and said ferrule having orienting means thereon positioned symmetrically with respect to said remainder of said front face to enable said ferrule to be positioned with said remainder in a predetermined position with respect to a ferrule holder.

2. A ferrule according to claim 1 characterized by said ferrule having an outer rear wall smaller than said outer front wall, said orienting means being a generally radially-extending protrusion on an outer surface of said outer rear wall extending outwardly therefrom.

3. A ferrule according to claim 1 characterized by said inner rear wall having a plurality of inwardly-extending protrusions to space said inner rear wall from a stud to be welded and providing spaces between the protrusions which are larger in area than said protrusions to provide additional venting for gases in addition to that provided by said notches.

4. A ferrule according to claim 1 characterized by said inner rear wall having at least one protrusion asymmetrically spaced with respect to said inner rear wall to space said inner rear wall from a stud to be welded a greater distance on the side of the rear wall opposite said unvented remainder of said front face.

5. A ferrule according to claim 4 characterized by said protrusion also being effective to space said inner front wall from a stud to be welded a greater distance on the side of said inner front wall opposite said unvented remainder.

6. A ferrule according to claim 4 characterized by said passage being circular in transverse cross section.

7. A ferrule according to claim 1 characterized by said inner front wall forming a chamber which is oval in transverse cross section and providing a larger volume of the side of said ferrule having the notches.

8. A ferrule according to claim 5 characterized by said inner front wall forming a chamber which is circular in transverse cross section throughout its depth.

9. A ferrule for use in welding a stud to a workpiece, said ferrule comprising a ceramic body having a front face, an outer wall near the front face, an inner front wall near the front face, and an inner rear wall of substantially smaller transverse cross section, a plurality of substantially uniformly spaced notches in said front face, extending from the outer cylindrical wall through to the inner wall, and extending around from one-half to three-fourths of said front face, the remainder of said front face being arcuate and substantially unvented from the last of said notches at one end of the plurality to the last of said notches at the other end of the plurality, and said ferrule having means so that a cavity formed around the shank of the stud by said front inner wall has a greater volume on the side of said stud shank away from said unvented portion of the front face.

10. A ferrule according to claim 9 characterized by said inner rear wall of said ferrule being circular and having a diameter greater than the diameter of the shank of the stud and said ferrule means spacing the surface of the rear wall farther away from the shank of the stud on the side opposite the unvented face portion of the ferrule.

11. A ferrule according to claim 2 characterized further by a ferrule holder for said ferrule having a central notch and two outer notches to receive said protrusion with said outer notches being uniformly spaced from said central notch.

12. A ferrule according to claim 11 characterized by said outer notches forming 90° included angles with respect to said central notch.

* * * * *